United States Patent [19]

Engelhart et al.

[11] 3,812,595
[45] May 28, 1974

[54] METHOD OF AND MEANS FOR FLASH DRYING NATURALLY OCCURRING OILSEEDS

[76] Inventors: Donald Spencer Engelhart, 10600 Drew St., Chicago, Ill. 60643; Ned Henry Engelhart, 32 W. 60th St., Westmont, Ill. 60559

[22] Filed: June 21, 1972

[21] Appl. No.: 264,984

[52] U.S. Cl. .................................... 34/10, 34/57 R
[51] Int. Cl. ............................................... F26b 3/10
[58] Field of Search .......... 34/10, 57 R, 57 E, 57 A; 432/15, 58; 209/138 R, 139 R

[56] References Cited
UNITED STATES PATENTS

| | | | |
|---|---|---|---|
| 2,692,047 | 10/1954 | Frevert............................. | 209/139 R |
| 2,697,517 | 12/1954 | Topp................................. | 209/139 R |
| 3,277,581 | 10/1966 | Towery et al.................... | 34/57 R X |
| 3,512,342 | 5/1970 | Francis et al. ................... | 209/139 R X |
| 3,398,457 | 8/1968 | Pease................................ | 34/10 |
| 2,666,269 | 1/1954 | Parry................................ | 34/10 |
| 3,497,418 | 2/1970 | Thale et al....................... | 34/10 |

*Primary Examiner*—Carroll B. Dority, Jr.
*Assistant Examiner*—William C. Anderson

[57] ABSTRACT

Oil and protein bearing naturally occurring seeds, beans, such as cottonseeds, rapeseeds, soybeans, high in moisture content and not suitable for storage, are subjected to a process which involves the reduction in the surface moisture and absorbed water content of the solids material to the desired moisture content at an accelerated drying rate, utilizing flash drying, which is suit-able, and safe, for storage and for future processing of the afore-mentioned Earth produced materials. The method and means involves specially designed equipment employing heated gases, at very minimal retention time, cocurrent contact gases-oilseeds, to effect the efficient vaporization and removal of the moisture to the desired level, dependent on the particular material. The process is conducted on a continuous basis, utilizing the naturally occurring material without denaturation of the protein content.

A consequential advantage and benefit of this drying process is the cleaning of the oil and protein bearing naturally occurring seeds, beans, as mentioned heretofore, prior to the drying method, to separate undesirable materials, such as stems, sticks, leaves, dirt, dust, dockage, from the whole seeds, beans, as received, in specially designed attendant equipment as an integral portion of the process.

6 Claims, 1 Drawing Figure

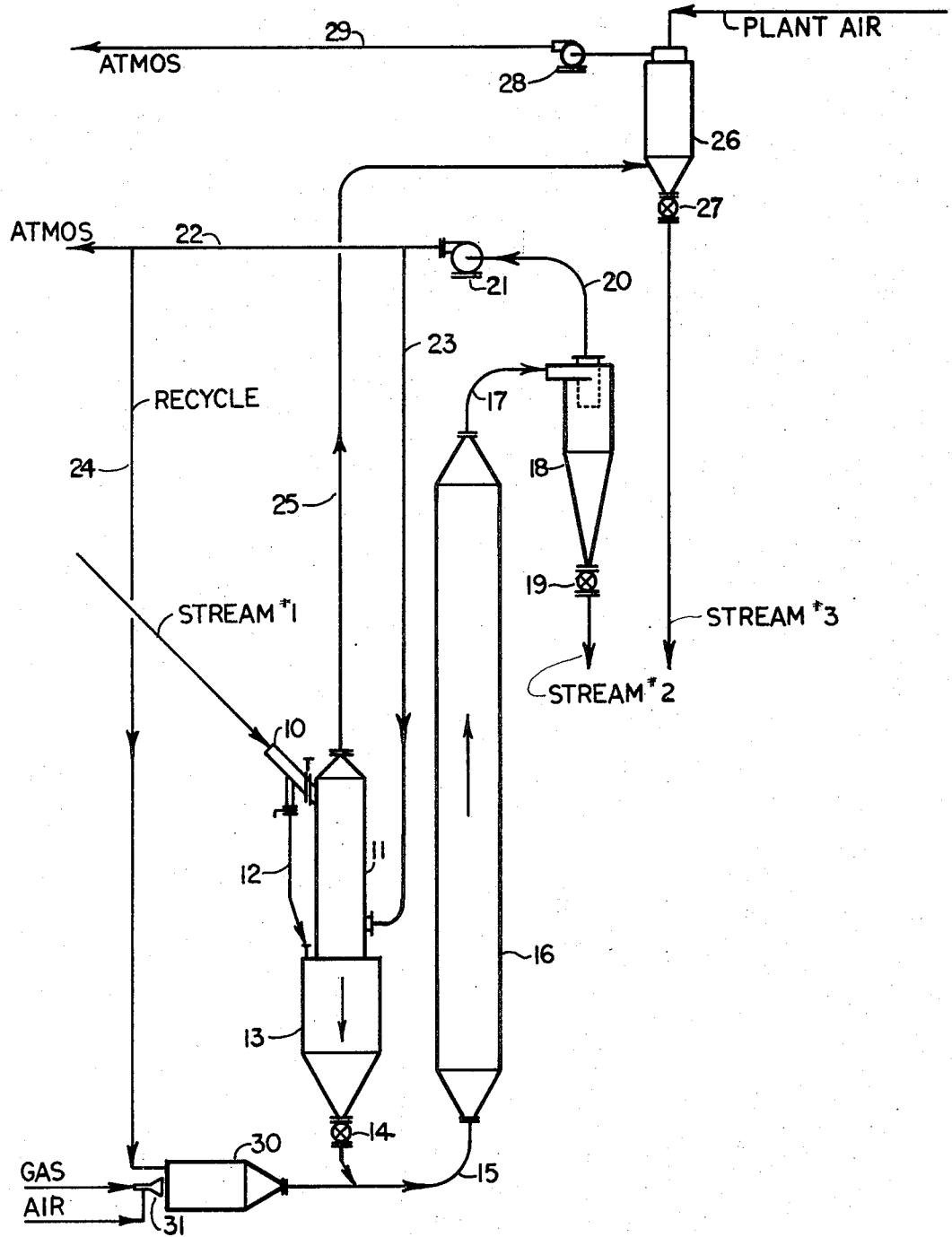

METHOD OF AND MEANS FOR FLASH DRYING NATURALLY OCCURRING OILSEEDS

DESCRIPTION OF THE INVENTION

This invention relates generally to the accelerated drying, flash drying, of naturally occurring oilseeds, such as cottonseeds, rapeseeds, soybeans, as received basis, to the desired water moisture level suitable for storage of the materials and to minimize denaturation of the protein content of the oilseeds. More particularly it relates to an improved procedure for the accelerated moisture reduction without denaturation of the protein content and the cleaning of the as received materials from undesireable and foreign materials, such as stems, sticks, leaves, dirt, dust, etc., from the whole seeds, beans, by proper aspiration.

OBJECTS OF THE INVENTION

It is the general object of the invention to provide an improved method for effecting efficient water moisture reduction and minimize protein denaturation on a continuous basis which is unique, novel, practical, requires minimal investment and is characterized by low operational and maintenance expenditures.

Another object of the invention is to provide an improved method for the efficient removal of water moisture at accelerated rates to the desired content and minimize denaturation of the protein content in addition to the cleaning the whole seeds, beans, of undesireable, foreign, materials, in a one step operational procedure.

A still further object of the invention is to provide a new and novel means for the accelerated drying of the naturally occurring oilseeds, beans, to the desired water moisture content with controlled heat penetration of the oilseeds utilizing cocurrent contact of the solids with heated gases for movement of the material through the flash drying unit to achieve a product material dried to the desired moisture content and cleaned of undesireable and foreign materials as compared to current practice in this art for the particular oilseeds.

It is a still further object of the invention to provide a new and unique method for exposing material surfaces to the cocurrent heat source to effect efficient evaporation of the water moisture from the solids material under controlled flow conditions in equipment specifically suited and designed for the particular material with no externally or internally moving mechanisms in the cleaning and accelerated drying units.

A still further object of the invention is to provide a new and novel means for cleaning and drying naturally occurring oilseeds, beans, utilizing cocurrent contact solids-gases, proper solids gases ratio and flow control of the material through the unit by proper design to achieve intimate solids-gases contact to promote vaporization of the surface and absorbed water moisture, dependent on the particular material, and produce a material dried to the desired content.

A still further object of the invention is to provide an improved method for effecting evaporation of the water moisture from the material, such as cottonseeds, rapeseeds, soybeans, utilizing the proper solids loading of the heated gases stream and heat content at minimal retention or contact time.

It is a still further object of the invention to provide a new and unique method for the reduction in water moisture content of the material and cleaning of the oilseeds utilizing flow control of the solids-gases in a cocurrent means to effect and product a solids material dried to the desired moisture content dpendent on the particular material.

Toward the accomplishment of these and other objects of our invention, it contemplates subjecting naturally occurring oilseeds, beans, such as cottonseed, rapeseed, soybean, to a process which involves cleaning of the whole material from undesireable and foreign material and accelerated drying of the material to the desired moisture level, dependent on the particular material, in equipment specifically designed to regulate and control the flow of the solids-gases in intimate cocurrent contact, recognizing solids and gases mass transfer rates, temperature and heat content of the gases stream, temperature differential gas to solid, size of the solids material, overall heat transfer coefficients, diffusion, temperature penetration of the solids, surfaces exposed, porosity or permeability of the oilseeds, gas encapsulation of the solids materials, required for the effective and efficient reduction in water moisture content of the feed material to achieve a product with the desired moisture content at minimal retention or contact time.

PRIOR ART PROCESSES

We are aware that procedures and equipment utilizing mechanical methods for drying materials have been suggested in the prior art. In a typical prior art procedure, a steel rectangular structure of considerable height is used into which the wet grain is introduced into the top and cascades over formed and movable baffles to adjust the flow of the grain as it moves from the top to the bottom of the unit. Heated gases flow upward and contact the wet grain ina direction normal to the grain movement and are exhausted from the unit by means of an induced draft fan. Cooling air may be contacted with the grain as it leaves the drying section of the unit with movement induced by means of the fan mentioned heretofore. The retention time in the drying unit is generally 40–90 minutes dependent on the particular material.

Heated air or gases is supplied to the bottom of the unit and fuel may be gaseous or liquid.

The exhaust gases are generally discharged from the unit into dust collection equipment, such as settling chambers, air scrubbers, to avoid atmospheric contamination of the ecology. Sometimes exhaust gases are recycled to the unit to increase the heat efficiency of the dryer.

The processing unit described above is usually large in volume, high in height, requires considerable grate area, for the retention time necessary and is characterized by high operational and maintenance charges and more important is a fire hazard.

FURTHER OBJECTS OF THE INVENTION

An object of this invention is to achieve the drying of the particular oilseeds, beans, to the desired water moisture content as known to the art and current practice which is (1/600) or less the retention or contact time required in current techniques without significant denaturation of the protein content.

It is, as mentioned before, a characteristic of methods and procedures such as referred to, to dry oilseeds, beans, by methods and means using mechanically motivated equipment or devices to produce a material dried to the desired moisture content at a retention time which is approximately 40–90 minutes generally.

A basic concept of our invention is the cleaning of the whole seeds, beans, of undesirable or foreign materials and the accelerated drying of the material to the desired water content, dependent on the particular material, without significant denaturation of the protein content with cocurrent contact of the solids-gases at minimal retention time in equipment minimizing the fire hazard consideration.

The method and means presented for the continuous drying of the naturally occurring oilseeds, beans, cottonseeds, rapeseeds, soybeans, concerns solid and gas mass transfer rates, heat characteristics of the particular material, surfaces exposed, size of solids, heat penetration of the solids, solids gases ratio, gas encapsulation of the oil bearing material, retention time and other pertinent considerations as mentioned previously, may vary widely due to the fact that the Earth grown materials will vary to a significant degree and may be affected as to domestic or foreign origin, atmospheric and ecological considerations.

The range of solids and gases mass transfer rates in cocurrent intimate contact in the drying unit as an object of this invention is also wide varying, dependent on the particular oilseeds, beans, from 3,000–10,000 for solids and 3,000–23,000 pounds per hour-square foot for gas, solids gases ratio 0.15–1.0, at a retention time which is (1/600) or less the contact time required in current art methods and procedures.

Generally speaking, in practice the variables of the composition of the naturally occurring oilseeds, beans, dependent on the particular material, intimate cocurrent contact solids-gases, size of the material, temperature and heat content of the gases, heat characteristics of the material, solids gases ratio, solids and gases mass transfer rates, surfaces exposed, gases encapsulation of the solids, retention time, no mechanically motivated or driven parts in the cleaning or drying units, are such as to reduce the water moisture content of the material to the desired level suitable and safe for storage and further processing with little or no denaturation of the protein content of the material.

DESCRIPTION OF THE DRAWINGS

The invention will be more readily understood by reference to the accompanying drawing in which:

The single FIGURE represents a schematic flow diagram illustrating the procedure of the invention.

In the drawing, the wet naturally occurring oilseeds, beans, Stream 1, is discharged from a material conveying device into the feed chute 10 equipped with a by-pass 12 and enters an air separating unit 11 where undesireable and foreign materials are separated from the whole oilseeds, beans, by gases from duct 23. The cleaned materials enters feed bin 13 and is introduced into the heated gases duct 15 by means of the rotary feeder 14 where it is in intimate cocurrent contact with the hot gases. The solids feed material in the hot gases stream is introduced into the flash drying unit 16 where the material is reduced in water moisture content at a retention time which is 1.0 to 12.0 seconds dependent on the particular material heat characteristics and size. The hot gases at a temperature ranging from 285°–610° F., dependent on the particular material, in intimate contact with the feed material at the proper solids-gases ratio supply the required sensible and evaporative heat.

The gases and the solids material dried to the desired water moisture content leave the flash dryer 16 via duct 17 and are introduced into a cyclonic separator 18. Materials separated in unit 18 to the desired moisture content are discharged to storage or further processing by means of rotary valve 19, Stream No. 2. Gases separated in unit 18 exit through duct 20 to exhaust fan 21. Gases discharged from fan 21 are used in unit 11 to separate undesirable and foreign materials from the whole seeds, beans, recycled by means of duct 22, 24, to the heater 30 or discharged to the atmosphere. Gases used in the separator 11 exit the unit via duct 25 and enter a collector unit 26 where the undesireable and foreign material is separated from the air stream and discharged from unit 26 by means of the rotary valve 27, Stream 3. Gases exit unit 26 through exhaust fan 28 and are discharged to the atmosphere by means of duct 29.

Sensible and evaporative heat requirements for the process is supplied in heater 30 by burner 31. The fuel may be gaseous or liquid.

EXAMPLE

The following is an example of an illustrative mode of carrying out the process of this invention specifically related to the cleaning of undesireable and foreign materials, dockage, and efficient drying of soybeans, although it is to be recognized that the process for cleaning and accelerated drying is applicable to cottonseeds, rapeseeds, linseeds, and the like.

50,000 pounds of wet, as received, soybeans containing approximately 3 percent dockage are introduced into the cleaning unit. Cleaned material containing approximately 15 percent surface and absorbed water moisture content is introduced into the hot gases stream, temperature, 350°–495° F., to supply the necessary sensible and evaporative heat requirements. The solids-gases in cocurrent intimate contact, gases encapsulation of the solids, at a solids-gases ratio of approximately 0.35–0.65, enters the flash drying unit where the surface and absorbed moisture content is reduced at a retention time 1–8 seconds to achieve a product containing approximately 10 percent water moisture content.

It will be understood, of course, that the flash drying unit and attendant equipment may be constructed of any suitable materials of construction, it being properly sized for production rate, such as for example steel, Corten, stainless steels, to mention a few of the most important.

While in the foregoing discussion and the drawing the drying unit is shown in a vertical position, it is to be understood that the unit may be positioned other than mentioned heretofore dependent on the solid and gas mass transfer rates at minimal retention time.

It will, of course, be recognized that variations in positioning the flash drying unit will be dependent on the particular material to effect efficient reduction in the water moisture content in conjunction with the optimum combination of retention or contact time, material heat characteristics, solid and gas mass transfer rates, proper solids gases ratio, overall heat transfer coefficients, for the drying of oil bearing material, to achieve a product which is dried to the desired moisture content, cleaned, with little or no significant denaturation of the protein content.

It is to be understood, therefore, that the aforementioned description and example have been given only by way of illustrating and that the process of our invention is susceptible of variations without departing from the scope thereof, which is limited only by the claims which follow.

What is claimed is:

1. Method of seed preparation to control moisture and remove extraneous material which comprises producing down-flow, at a controlled rate, of a stream of seeds to be treated, producing an upward counterflow of air to carry out surface moisture and airborne extraneous material, moving said stream of seeds by a current of air through an enclosed flash dryer, said stream of seeds being under treatment in said dryer at a temperature of from 285° F. to 610° F. for a period of from 1 to 12 seconds, then subjecting said stream of heated seeds and carrying air to centrifugal separation of gases from seeds, and recovering said seeds.

2. Method of seed preparation to control moisture and remove extraneous material, which comprises moving a stream of the seeds to be treated downwardly through a tubular cleaning passageway, driving a stream of air upwardly through said passageway to clean the seeds, creating a stream of hot gases of combustion, conducting said stream of hot gases vertically through a tubular flash dryer and introducing said cleaned seeds into the stream of hot gases prior to the entry of said hot gases into the dryer and centrifugally separating the seeds from the hot gases.

3. Method of treating seeds to remove moisture and dirt which comprises subjecting a confined stream of downwardly flowing untreated seeds to an upward current of dry air to separate and remove moisture and dirt, creating a stream of hot gases, driving said stream of hot gases upwardly through a flash dryer, introducing said downwardly flowing stream of seeds into said last named stream of hot gases at a temperature of from 285° F. to 610° F. for a period of from 1 to 8 seconds subjecting said stream of gases and seeds to centrifugal separation and recovering said treated seeds.

4. The method of claim 3 wherein the stream of hot gases is the product of a gas burner and wherein a portion of the stream of heated gases, after separation from the seeds, is returned to said gas burner.

5. Method of treating seeds to remove extraneous solids and moisture which comprises setting up a downflowing stream of untreated seeds, driving a stream of heated air upward through said stream of seeds to remove moisture and extraneous solids, creating a stream of hot air and products of combustion at a temperature of from 285° F. to 610° F., delivering said stream of downflowing seeds after removal of moisture and external solids into an upwardly moving stream of hot air and products of combustion for a period of from 1.0 to 12.0 seconds and centrifugally separating the hot gases and treated seeds.

6. Means for cleaning and drying seeds comprising the combination of a countercurrent cleaning unit having a seed supplying inlet at its upper end and a seed outlet at its lower end, a hot air inlet adjacent its lower end and an exhaust air outlet at its upper end, a surge tank for seeds communicating with said lower end of the cleaning unit to receive discharge of seeds from said countercurrent cleaning unit, a hot air furnace, means for creating a flow of heated air from said furnace, a seed feeder for delivering seeds at a predetermined rate from the surge tank into said flow of heated air from said furnace, a flash dryer maintained at an internal temperature of 285° F. to 610° F., a cyclone separator, said flash dryer delivering the flow of heated air from the furnace and entrained seeds to the inlet of said cyclone separator, means for withdrawing the seeds from the separator and a pump having its inlet connected to the exhaust outlet of said separator and its discharge connected to the hot air inlet at the lower end of the countercurrent cleaning unit.

* * * * *